United States Patent [19]

Beernaerts et al.

[11] 4,114,213
[45] * Sep. 19, 1978

[54] METHOD FOR MANUFACTURING ESSENTIALLY WRINKLE-FREE FOAMED ARTICLES WITH AN UPHOLSTERY MATERIAL ADHERING THERETO AND RESULTANT ARTICLE

[75] Inventors: Andre M. H. J. Beernaerts, Gembloux, Belgium; Hendrik J. K. Eskes, Apeldoorn, Netherlands

[73] Assignee: International B. F. Goodrich-Europe B.V., The Hague, Netherlands

[*] Notice: The portion of the term of this patent subsequent to Jun. 19, 1995, has been disclaimed.

[21] Appl. No.: 599,480

[22] Filed: Jul. 28, 1975

[51] Int. Cl.² .................. A47C 7/18; B29D 27/04
[52] U.S. Cl. ........................... 5/345 R; 5/355; 5/361 B; 156/78; 156/227; 156/285; 264/46.8; 264/257; 264/266; 297/452; 297/458; 425/555; 425/817 R
[58] Field of Search ............ 264/46.8, 46.6, 46.4, 264/257, 266; 5/345 R, 355, 361; 297/452, 458; 456/28, 227; 156/285; 425/555, 817 R

[56] References Cited

U.S. PATENT DOCUMENTS

| 3,377,103 | 4/1968 | Borton et al. ............... 297/458 X |
| 3,505,436 | 4/1970 | Krug et al. ..................... 264/46.8 |
| 3,566,423 | 3/1971 | Reinfeldt ........................ 5/345 R |
| 3,771,828 | 11/1973 | Schwitters ..................... 297/452 |
| 3,844,614 | 10/1974 | Babbs ........................... 297/452 |
| 3,895,087 | 7/1975 | Ottinger et al. .............. 264/46.8 X |
| 3,943,215 | 3/1976 | Grüne et al. ................. 264/46.8 X |

FOREIGN PATENT DOCUMENTS

| 1,325,622 | 8/1973 | United Kingdom ............ 264/46.8 |
| 1,402,553 | 8/1975 | United Kingdom ............ 264/46.8 |

*Primary Examiner*—Philip Anderson
*Attorney, Agent, or Firm*—Karl W. Flocks

[57] ABSTRACT

A foam-padded article such as an auto seat cushion having an outer upholstery integrally adhered to the foam is made by vacuum forming an airtight upholstery layer to which the foam adheres and then introducing the foamable cushioning material and foaming it into contact with the formed upholstery. Controllable folds are intentionally formed in desireable locations in the article, as for example, in one or more corners of a cushion not subject to heavy wear, by pressing one or more fold-forming plates into the upholstery layer in the forming mold before the foamed cushioning material sets thereby tensioning the remainder of the layer. The apparatus yieldably clamps the edges of upholstery surrounding the area to be folded while non-yieldably clamping it in areas to be tensioned. The folds so formed may be sealed with an adhesive before foaming occurs thereby assuring more permanent tensioning of the upholstery in the product.

9 Claims, 5 Drawing Figures

METHOD FOR MANUFACTURING ESSENTIALLY WRINKLE-FREE FOAMED ARTICLES WITH AN UPHOLSTERY MATERIAL ADHERING THERETO AND RESULTANT ARTICLE

BACKGROUND OF THE INVENTION

This invention relates to a method of manufacturing foam-padded articles with an integral upholstery adhering thereto employing a vacuum forming mold, where a substantially airtight upholstery, after being placed in the mold, is brought into the desired shape by means of a vacuum under the upholstery whereafter a foamable synthetic material is foamed in the mold. The invention also relates to apparatus for manufacturing such upholstered foamed articles and to upholstered foamed articles manufactured according to said method or in said apparatus.

Foamed articles with an upholstery adhering thereto are generally known and are used as cushions, backs of seats, arm-rests, panels and such articles for motor vehicles, seating furniture, beds and other purposes. The upholstery may or may not be provided with a decorative surface. Such foamed articles have the advantage that they can be manufactured inexpensively, as no manual upholstery operations are to be carried out and the upholstery, since it adheres to the foam body, is considerably less subject to wear than are form articles with a loose upholstery.

A disadvantage of foamed articles provided with an upholstery made by deep drawn vacuum forming is that during vacuum forming wrinkles may occur at undesired places in the upholstery, which not only give such articles a less attractive aspect, but which also expose the projections formed by the wrinkles to more wear than the other parts of the upholstery.

SUMMARY OF INVENTION

The object of the present invention is to avoid these uncontrollable wrinkles, which depend on the shape of the mold and on the elasticity of the upholstery material, and to make in such articles controllable folds, which are formed at predetermined locations, especially in the corners of the articles. This is realized with the method according to the invention, in that folds are made in the upholstery during the vacuum forming operation by pressing inwardly by means of at least one slide, plate or similar object at at least one predetermined location in the mold before the synthetic foam material has hardened. Known materials, such as synthetic thermoplastic material, fibrous material, flocked material, felt material, knitted or woven fabric, preferably elastic in two directions, may be used for the upholstery, which is provided on its side which will be facing the foamed synthetic material with an airtight adhesive coating, which coating adheres to the foamed material. If necessary, the airtight adhesive coating may have undergone a treatment such that it adheres firmly to the foamed material which is brought into the mold after the vacuum forming of the upholstery material.

With one advantageous embodiment of the method according to the invention, the wrinkles due to deeply drawn vacuum forming normally occurring at unexpected or undesired locations in the upholstery are formed at more desirable locations by pressing inwardly at any predetermined location on the upholstery during the vacuum forming of the upholstery, whereafter the foamable synthetic material is introduced into the mold. The undesired wrinkles normally formed by vacuum forming are thus straightened out by the fold or folds formed by pressing inwardly on the upholstery at the predetermined location or locations. The folds thus made at the predetermined locations may be provided with an adhesive, so that such folds cannot open again.

The folds made in the upholstery during vacuum forming, may also be pressed in after the vacuum forming of the upholstery and after the foamable material has been brought into the mold, but before the foamed material has hardened.

It is obvious that the slide or slides, plates or similar objects must have such dimensions that all excess upholstery material, which causes wrinkles, may be taken up by the fold or folds induced at the predetermined location or locations.

The apparatus utilized according to the invention, which is provided with a mold having a portion provided with holes against which the upholstery material lies and under which there is a vacuum space, is characterized in that it is provided with at least one fold-forming slide, plate or similar means. According to the invention, at least one such fold-forming slide, plate or similar means may be mounted in the mold in such a way it can be operated from outside the apparatus. As such slide, plate or similar means can be operated from the outside, the distance in which such slide, plate or similar means is pressed into the mold can be so chosen that insures that any wrinkle at other than the desired place is straightened out so that folds occur only at the predetermined location or locations whereby the advantage is achieved that the apparatus is appropriate for manufacturing upholstered articles with upholstery of differing properties.

At least one fold-forming slide or plate or similar means may also be secured or fixed at a predetermined location in the mold, so that only at such location or locations in the mold may a fold occur, as a fold or wrinkle trying to form itself at another place is straightened out immediately. The apparatus utilized according to the invention may be made appropriate for manufacturing upholstered articles with differing shapes, as the portion of the female mold member portion having the vacuum holes can be made replaceable with another of a differing shape.

DETAILED DESCRIPTION

The invention will now be described more fully by reference to the drawings which show, by way of example, two embodiments in a single mold for the manufacture of an upholstered foamed article according to the invention and an upholstered foamed article made by means of such mold.

Figure 2:
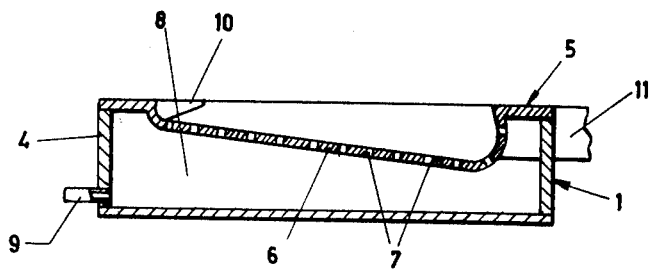
FIG. 2 shows a cross sectional view taken along the line II—II in FIG. 1.

The apparatus 1 shown in the drawings, which is to be used for manufacturing a cushion 3 having rounded corners and provided with an upholstery 2, as shown in FIG. 2 consists of a box 4, which is closed at its top side by the female mold member having a flat, closed outer edge 5 and which has a deepened middle portion 6 having the shape of the cushions to be manufactured therein, which middle portion 6 is provided with air passages 7 through which vacuum is drawn against the upholstery. Under the female mold member is a chamber 8 which is connected by means of pipe stub 9 to a vacuum pump, which is not shown.

Figure 1:
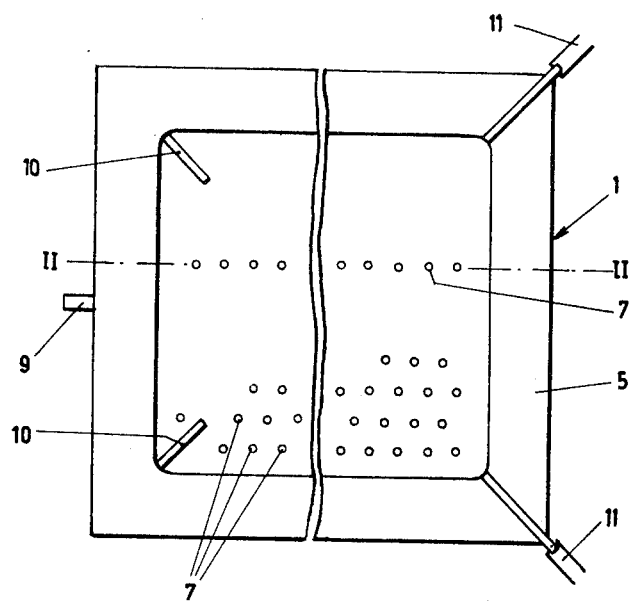
FIG. 1 shows a schematic top view of such mold including such two embodiments of the apparatus according to the invention.

The left-hand part of FIG. 1 shows one embodiment in which fixed plates 10,10 are secured in the corners of the deepened part 6 of the female mold member, which plates, as will be described below, serve for depressing the upholstery material into the cushion to be manufactured forming a fold at each corner.

The right hand half on FIG. 1 shows the embodiment in which said plates are carried outside the box as slides 11,11 made of metal sheet.

Figure 3:
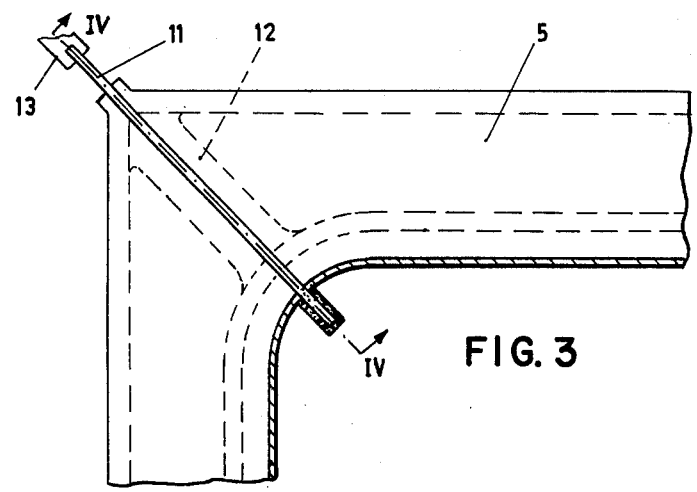
FIG. 3 shows an enlarged partial top view of one of the right hand corners of the mold of FIG. 1.
Figure 4:
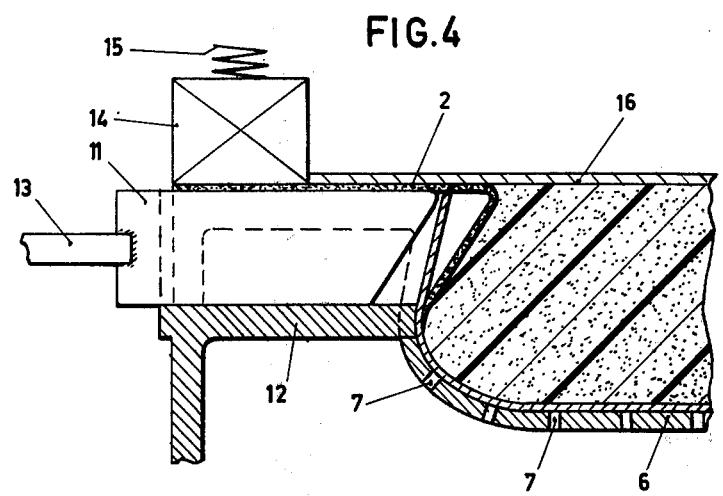
FIG. 4 is a partial view in section taken along the line IV—IV in FIG. 3.
Figure 5:
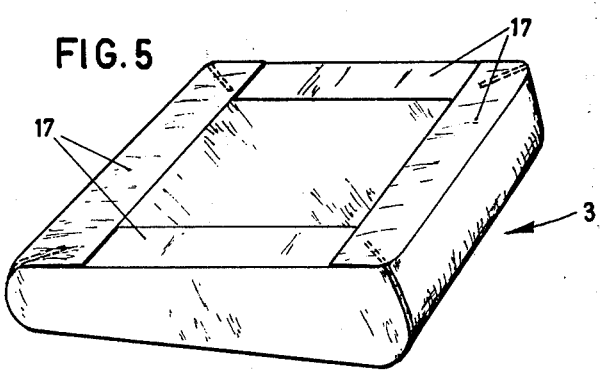
FIG. 5 shows the underside of an article manufactured by means of the mold shown in FIGS. 1–4.

The mold portions 5,6 may be mounted so as to be detachable from the box 4 as shown in the drawings, so that they may be replaced individually or collectively, thus giving a different shape to the female mold parts, so that differently shaped cushions may be manufactured therein. FIGS. 3 and 4 show an enlarged view of a corner of the embodiment shown in the right-hand half of the mold of FIG. 1. As is shown, the plate-shaped slides 11,11 are mounted in a guide or slot 12 in the apparatus. The slide 11 projects beyond the mold and is provided with an operating means 13 which can be controlled automatically or manually. Preferably, the stroke of the slide 11 is adjustable. The slide 11 is mounted in the guide 12 in such a way that the slide is exchangeable and can be replaced by a slide having a differently shaped front end.

The guide 12 for the slide 11 is mounted in such a way, that it is not connected with the space 8 under the middle portion 6 of the mold having the air passages so that no air can flow through the guide 12 into the space 8 when a sheet of upholstery material is provided in the mold.

The apparatus is provided with a top-mounted frame 14 for yieldably supporting or clamping the upholstery material 2, which frame is biased by springs 15 or some other such means, so that the upholstery material 2 may slide or yield underneath the frame 14 at those locations where this is necessary during the vacuum forming, whereas the said frame 14 also prevents the yielding or sliding or yielding of the fabric at other locations where no extra upholstery material is necessary. The deepened middle portion 6 of the mold is provided (see FIG. 4) with a solid cover plate 16, so that a flat base on the cushion is obtained when the foamable material is fully foamed.

With the above described apparatus the method according to the invention is carried out as follows: A sheet of upholstery material 2 is placed so as to overlay the edges 5 of the mold and cover completely the middle portion 6 of the mold.

The sheet of upholstery material 2 comprises a knitted or woven fabric which is elastic in all directions and which is provided on one side with a continuous coating of a material which also is elastic in all directions and is made of a substantially adhesive material, e.g. polyvinyl chloride or other thermoplastic material. This air-tight coating can be roughened or provided with an adhesive coating or treated in any other way so that the material of the foam core of the cushion 3 will adhere well to the upholstery 2. Such sheet of upholstery material 2 is placed on the mold with the airtight coating facing up over the mold such that after forming it faces inwardly toward the deepened portion 6 of the female mold member and away from the mold surfaces.

After the upholstery material has been put in place and the frame 14 secured in position, the space or chamber 8 under the deepened portion 6 of the mold is connected to a vacuum pump or other source of vacuum through tube 9 so that a vacuum is created in space 8. Thus the upholstery material 2 is drawn down against the surface of the female mold member 6, whereas at those locations where an extra quantity of upholstery is needed, the portions thereof which are located under the spring-biased portions of frame 14 may yield or move locally. If desired, the upholstery material and/or the female mold portions 5,6 may be heated in order to facilitate a good fit against the deeper portions 6 of the mold. During the vacuum forming of the sheet of upholstery material 2, folds or wrinkles would normally occur at unexpected or undesired locations were no fixed plates 10 or slideable plates 11 to be provided in the deepened portion 6 of the female mold 5,6.

Where only fixed plates 10 are utilized they should have such dimensions that they take up slack in the upholstery and straighten out all wrinkles which otherwise would form in an undesired location in the cushion 3. This implies that the dimensions of these fixed plates have to be determined by experiments, after which they may be secured in the deepened portion of the mold, e.g. by means of dovetails attached to them and dovetail slots provided in the wall of the deepened portion 6 of the mold.

If the plates 10 are carried out of the box 4 as slides 11, the stroke of said slides can also be chosen or changed, also by experiments, that the manufactured cushion has no wrinkles in undesired locations.

If desired, use may be made of a male mold member or similar pressing device, which may or may not be heated and which fits into the deepened portion 6 of the female mold before a vacuum is created in chamber 8 under the deepened portion 6.

After the synthetic foamable material has been placed into the upholstery-covered female mold 5,6, the cover plate 16 is secured in place on top of the edges 5 and the foamable material caused to foam so as to fill the mold and adhere to the upholstery material.

Folds intentionally formed by the plates 10 as described above may be sealed, before the foaming step, if desired, by means of an adhesive which is applied to at least one of the sides of the folds. Such sealing of the folds will tend to keep the upholstery more tautly in contact with the foam core during use.

The foam filling of the cushion may be of any synthetic foamable material but is preferably the generally-known two-component polyurethane foam system where both components are pre-mixed before being introduced into the female mold portion 6.

The moveable slides 11 may be operated after the vacuum forming of the upholstery whereby direct visual confirmation can be had that all undesired wrinkles in the upholstery are eliminated as well as during or after the introduction of the foamable material. Care, however, has to be exercised that this be done before the foam material sets or is hardened, so that the upholstery material may still slide or yield with respect to the foam and does not yet adhere thereto firmly.

When the foam material has hardened, the cushion may be removed from the apparatus, after which the edges 17,17 of the upholstery material, which are held or clamped under the frame 14, may be glued to the underside of the cushion.

It is observed that the way in which the upholstery material is made substantially airtight, the way in which the synthetic foamable material is brought into the mold portion 6 of the apparatus, and the composition of the synthetic foamable material are not described in detail, as they are generally known in the art.

It will be obvious that the invention is not restricted to the embodiments of the apparatus according to the invention as are described and as shown in the drawings, but that these can be modified in numerous ways without departing from the spirit and scope of the invention.

We claim:

1. In a method of manufacturing foam-padded upholstered articles with an integral stretchable upholstery material adhering to the foam, in a female mold part and an opposing part, in which said female mold part is divided by separating wall means into a cavity in the shape of the article and into a vacuum chamber, said cavity and said chamber in communication with each other by holes in said separating wall means, said opposing part forming a closure of said femal mold part, comprising the steps of positioning a sheet of stretchable upholstery material in the cavity of said female mold part with the ends of said upholstery material resting on the outer edge of said female mold part;

exhausting said vacuum chamber to form at least a partial vacuum therein and produce sliding of the upholstery material on said outer edge toward the periphery of said mold cavity and into engagement with said separating wall means in said cavity whereby wrinkles may be formed in undesired locations in said upholstery material;

introducing a foamable material into said cavity;

foaming said foamable material;

and taking the finished product out of the mold;

and the improvement which comprises the step of forming one or more folds in said upholstery material in one or more predetermined locations by pressing inwardly on siad upholstery material into said cavity with a plate in said cavity at said one or more predetermined locations to form said one or more folds of said upholstery material in said foamable material before said foamable material is hardened, and thereby straighten out the wrinkles formed in undesired locations.

2. A method as defined in claim 1 and further characterized by said plate for forming a fold at said one or more predetermined locations being secured in a fixed manner in said cavity.

3. A method as defined in claim 1 and further characterized by said plate for forming a fold at said one or more predetermined locations including a sliding sheet controlled for movement into said cavity.

4. A method as defined in claim 1 further characterized by introducing a plurality of folds in said upholstery material during the exhausting of said vacuum chamber and vacuum forming of said upholstery material and subsequently foaming said foamable material into contact with the resulting formed and folded upholstery material.

5. A method as defined in claim 4 further characterized by applying an adhesive to seal said plurality of folds before said foamable material is foamed into contact with said formed and folded upholstery material.

6. A method as defined in claim 1 further characterized by introducing a plurality of folds in said upholstery material after the vacuum forming thereof and while said foamable material is being foamed into contact therewith.

7. A foam padded article manufactured by the method of claim 1 and having an integral stretchable upholstery adhering to the foam characterized in that the article has at least one fold in the upholstery material formed at a predetermined location on the article.

8. A foam padded article manufactured by the method of claim 1 and comprising foamed material;

stretchable upholstery integrally adhering to said foamed material;

at least one fold formed at a predetermined location in said upholstery;

said fold extending from the periphery of the article into said foamed material.

9. The article of claim 8 further characterized by an adhesive sealing said at least one fold independently of said surrounding foamed material.

* * * * *